Patented Sept. 4, 1928.

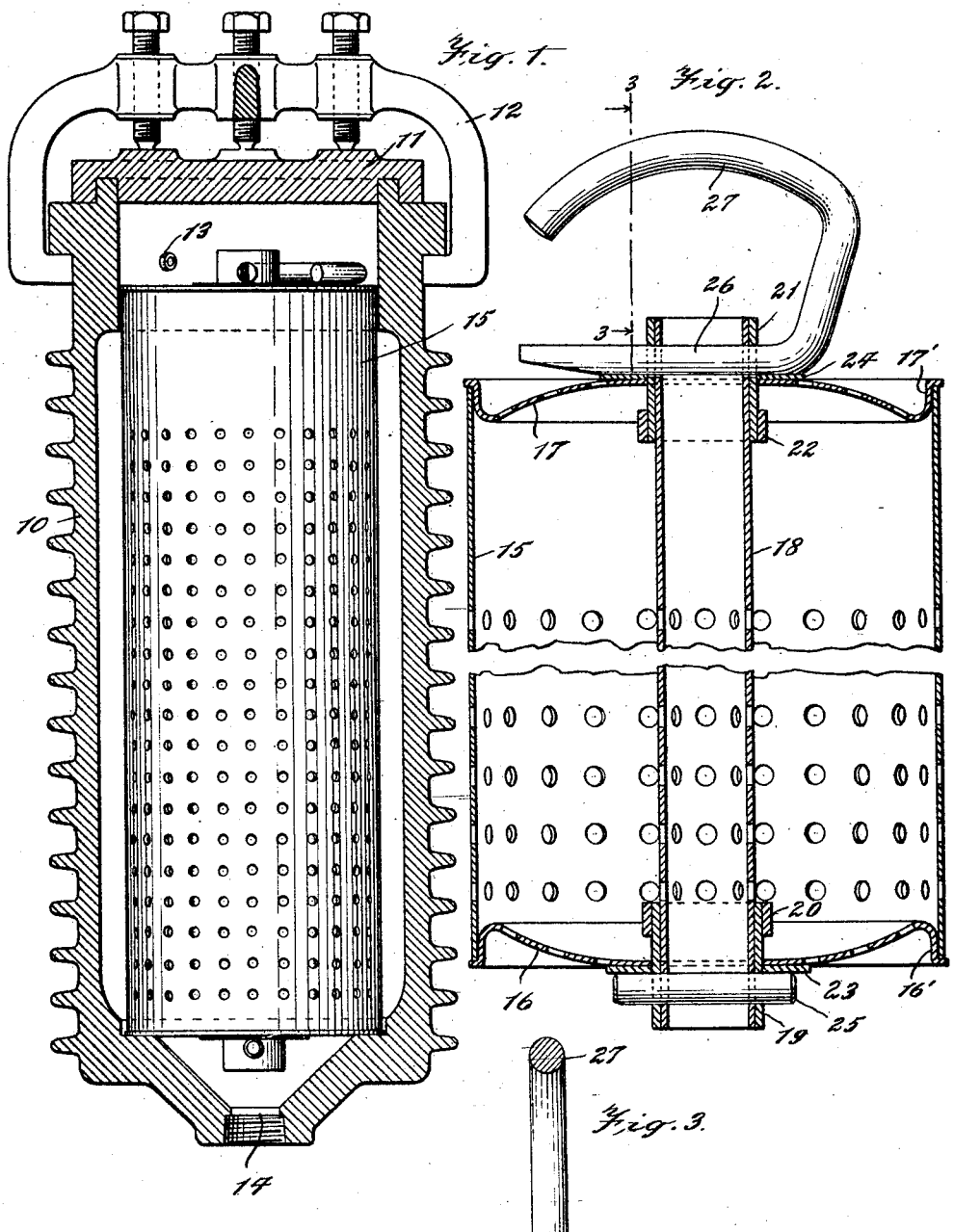

1,683,102

UNITED STATES PATENT OFFICE.

JOSEPH F. SANFTLEBEN, OF NEW YORK, N. Y., ASSIGNOR TO FILTRATORS COMPANY, INC., OF NEW YORK, N. Y., A CORPORATION OF NEW YORK.

CONTAINER FOR EXTRACTING APPARATUS.

Application filed October 23, 1926. Serial No. 143,773.

My present invention relates to improvements in devices in which substances are held in a container so as to be subjected to steam and water, whereby an extract from such substance may be obtained, and is particularly useful in connection with devices by which the mucilaginous substances are extracted from flaxseed for use in treatment of water in steam boilers and the like. My invention will be best understood from the following description and annexed drawing, in which Fig. 1 is a section of an illustrative form of an extraction tank of a known type showing a container with my present invention incorporated therein in operative position; Fig. 2 is a vertical section, partly broken away, of the container shown in Fig. 1, with the handle as it would be positioned when the container is to be lifted from the tank; and Fig. 3 is a section on the line 3—3 of one of the parts shown in Fig. 2.

Like reference characters indicate like parts in the several views.

The illustrative arrangement shown in the drawing is particularly applicable to devices now in use in which flaxseed is held in a container and treated with steam and the condensate thereof to produce a mucilaginous extract for use in the treatment of boiler water, and in the following description, the device will be described as it will be used for such purpose, but it will be understood that it may be used for any similar purpose.

The tank 10 is provided with a suitable cover 11 held in place by a device 12 of known construction, steam entering the tank through the opening 13 and the condensate, which has been converted into an emulsion, leaving the tank through the opening 14. This arangement is old and well-known and further description thereof will not be necessary to those skilled in the art.

Within the tank 10 is a container 15 made preferably of relatively thin sheet metal and provided with numerous perforations, this container being provided with a bottom lid 16 and a top lid 17, also preferably of relatively thin perforated sheet metal. The bottom and top lids are provided with outturned edges which fit relatively snugly within the walls of the container 15 and are provided with ledges to hold them at the bottom and the top respectively of the wall of the container.

A tube or hollow rod 18 extends through the bottom and top lids, the lower end of the tube being provided with a sleeve 19 fastened to the tube and an outstanding shoulder in the form of a collar 20, also fastened to the parts 18 and 19, as by welding or the like. The upper end of the tube 18 is similarly provided with a sleeve 21 and a collar 22. The bottom 16 is provided with a flat washer 23 and the top with a flat washer 24.

A pin 25 extends through a hole through the walls of the tube 18 and sleeve 19, this hole being positioned so that, when the pin 25 is in place, the parts are held as shown in Fig. 2. Similarly, the upper end of tube 18 is provided with a hole through which extends the lower part 26 of a locking handle having a handle portion 27. As shown best in Fig. 3, the part 26 is round except for a flat part 28 on the lower side thereof opposite the handle portion 27. It will also be noticed that the collars 20 and 22, when the parts are in position as shown in Fig. 2, are spaced from the bottom lid 16 and the top lid 17, respectively.

Particularly when the substance from which the extract is to be made is of a mucilaginous character, the lids of the container are liable to stick to the container walls and consequently it is difficult to open the container when it is desired to remove the substance from which the extract has been made, such as flaxseed, and to recharge the container, and the arrangement which I have provided obviates this difficulty.

When the container is in the tank 10, the handle 27 is turned flatwise as shown in Fig. 1, so as to bring the round portion of the part 26 against the washer 24 and thus lock the top and the bottom lids in the container.

When the container is to be emptied, the handle 27 is turned to the position shown in Fig. 2, thus bringing the flat part 28 opposite the washer 24 and this relieves the pressure sufficiently to permit the part 26 to be readily removed from the hole through the tube 18. Then the container is dropped on the floor with the top 17 downward, and since the tube 18 extends beyond the top 17, this causes the tube 18 to be moved to bring the collar 20 against the interior of the bottom 16 and knock the same out of the container 15. The bottom 16, either with or without the tube 18 and its connected parts, can then be removed from the container and the latter emptied and a new charge put in, after which the parts are again restored to the positions shown in Fig. 2.

The arrangement which I have shown is reversible and, if desired, the top lid 17 can be removed instead of the bottom lid 16, in that case, the pin 25 being first removed so that the tube 18, when dropped to the floor, will push out the top lid 17.

It will be noted that in the arrangement which I have provided, the bottom and top lids of the container can be made tight at the joints between the lid and the container and, at the same time, even if the mucilaginous material causes these lids to stick badly, nevertheless the force of the blow on the tube 18 will loosen the same by pushing from the interior and thus permit the opening of the container without destroying the lids and without difficulty on the part of the operator.

Preferably the outstanding portions 16' and 17' of the top and bottom lids will be made so that, before the part 26 is turned to the position shown in Fig. 1, they will be spaced somewhat from the walls 15, thus permitting the lids to be readily placed in position. Then, as the cam-like action takes place by the turning of the handle 27 from the position of Fig. 2 to that of Fig. 3, the washers 23 and 24 will be drawn together and this, due to the thinness of the lids 16, 17, will cause the latter to spring outward somewhat and to close the joint between the parts 16' and 17' and the walls 15.

While preferably I space the collars 20, 22 from the lids when they are in position, in order that they will not interfere with the placing of the lids in position on the container and so that the tube 18 will have a certain motion, when struck, before the collar strikes the lid, it will be understood that this is not essential and that the collars may be positioned close against the respective lids when the latter are in closed position.

It will also be understood that some of the features of my invention may be used independently of other features and that the arrangement which I have shown is merely illustrative and that the embodiment of my invention may be widely varied.

I claim:

1. A container having a lid and a member extending through the bottom of the container and freely movable therethrough and arranged to press against the interior of the lid to open the same when said member is moved toward the lid.

2. A container having a lid and a member extending through the bottom of the container and through the lid and freely movable therethrough, said member having a portion inside the container and arranged to press against the interior of the lid to open the same when said member is moved toward the lid.

3. A container having a lid at the top and at the bottom, and a member extending through both lids and freely movable therethrough, said member having a portion inside the container and at each end of the member and arranged to press against the interior of a lid to open the same when said member is moved toward that lid.

4. A container having a lid and a member extending through the bottom of the container and through the lid and freely movable therethrough, said member having a portion inside the container and arranged to press against the interior of the lid to open the same when said member is moved toward the lid, and removable locking means exterior to the container to hold said member against movement toward the lid.

5. A container having a lid at the top and at the bottom, and a member extending through both lids and freely movable therethrough, said member having a portion inside the container and at each end of the member and arranged to press against the interior of a lid to open the same when said member is moved toward that lid, and removable locking means at each end of said member and exterior to the container, to hold said member against motion toward either lid.

6. A container having a lid at the top and at the bottom, and a member extending through both lids and freely movable therethrough, said member having a portion inside the container and at each end of the member and arranged to press against the interior of a lid to open the same when said member is moved toward that lid, and removable locking means at each end of said member and exterior to the container, to hold said member against motion toward either lid, said locking means being arranged to hold both lids on the container.

7. A cylindrical container having a relatively thin sheet metal lid with a peripheral rim, the outside diameter of the rim, when the lid is removed from the container, being slightly smaller than the inside diameter of the container, and said lid being crowned at its center, and means to lock the lid on the container, including means to press the center of the lid toward the container, whereby the diameter of said rim is increased to produce a tight fit between the rim and the container.

8. A cylindrical container having a relatively thin sheet metal lid with a peripheral rim, the outside diameter of the rim, when the lid is removed from the container, being slightly smaller than the inside diameter of the container, and said lid being crowned at its center, a member extending through the bottom of the container and through the lid and held against motion toward the lid and a locking piece engaging said member to prevent the removal of the lid and arranged to press the center of the lid toward the container, whereby the diameter of said rim is increased to produce a tight fit between the rim and the container.

9. A container having a lid, a rod extending through the bottom of the container and the lid and movable axially therethrough, said rod having a shoulder inside the container and adjacent the lid, a removable pin extending through said rod and contacting with the exterior of the container bottom and a pin extending through the rod and contacting with the exterior of the lid.

10. A container having a lid, a rod extending through the bottom of the container and the lid and movable axially therethrough, said rod having a shoulder inside the container and adjacent the lid, a removable pin extending through said rod and contacting with the exterior of the container bottom and a pin extending through the rod and contacting with the exterior of the lid, one of said pins having a flat side and a handle connected to the pin, whereby the pin may be rotated to relieve pressure on the adjacent container part.

11. A container having a lid at the top and at the bottom, a rod extending through the lids and movable axially therethrough, and a removable pin at each end of the rod and extending through the rod in contact with the exterior of the adjacent lid, one of said pins having a flat side and a handle connected to the pin, whereby the pin may be rotated to relieve pressure on the adjacent lid.

JOSEPH F. SANFTLEBEN.